US012688468B1

(12) United States Patent
Billinge et al.

(10) Patent No.: US 12,688,468 B1
(45) Date of Patent: Jul. 21, 2026

(54) COMPUTATIONAL NATURALLY-OCCURRING-ACTION INTERPRETER FOR MACHINE LEARNING

(71) Applicant: The Trustees of Columbia University in the City of New York, New York, NY (US)

(72) Inventors: Simon J. L. Billinge, New York, NY (US); Yevgeny Rakita Shlafstein, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1184 days.

(21) Appl. No.: 17/552,975

(22) Filed: Dec. 16, 2021

Related U.S. Application Data

(60) Provisional application No. 63/129,037, filed on Dec. 22, 2020.

(51) Int. Cl.
| | |
|---|---|
| *G06N 20/00* | (2019.01) |
| *G06F 40/20* | (2020.01) |
| *G06N 7/01* | (2023.01) |
| *G06N 20/20* | (2019.01) |

(52) U.S. Cl.
CPC ............. *G06N 20/20* (2019.01); *G06F 40/20* (2020.01); *G06N 7/01* (2023.01)

(58) Field of Classification Search
CPC ........... G06N 20/20; G06N 7/01; G06F 40/20
See application file for complete search history.

(56) References Cited

U.S. PATENT DOCUMENTS

| | | | |
|---|---|---|---|
| 7,644,053 B2 | 1/2010 | Kipersztok et al. | |
| 8,140,301 B2 | 3/2012 | Abe et al. | |
| 2015/0347935 A1* | 12/2015 | Standing .............. | G05B 19/042 |
| | | | 705/7.27 |
| 2017/0199960 A1* | 7/2017 | Ghose ................... | G16B 30/10 |
| 2017/0206460 A1 | 7/2017 | Chang et al. | |
| 2019/0279775 A1 | 9/2019 | Dey et al. | |
| 2019/0318256 A1 | 10/2019 | Wei et al. | |
| 2020/0350036 A1* | 11/2020 | Ahmadizadeh ........ | G16B 20/00 |
| 2021/0398621 A1* | 12/2021 | Stojevic .............. | G06N 3/0464 |

(Continued)

OTHER PUBLICATIONS

Kayala, Matthew A., and Pierre Baldi. "ReactionPredictor: prediction of complex chemical reactions at the mechanistic level using machine learning." Journal of chemical information and modeling 52.10 (2012): 2526-2540 (Year: 2012).*

(Continued)

*Primary Examiner* — Andrew T McIntosh
(74) *Attorney, Agent, or Firm* — Potomac Law Group, PLLC

(57) ABSTRACT

Disclosed are methods, systems, device, and other implementations, including a method that includes receiving action data representative of a sequence of actions resulting in an outcome, the sequence of actions and the resulting outcome defining an observable process, transforming the action data into a normalized representation recognizable by a computing-based analysis engine, and processing the normalized representation by the analysis engine to generate an alternative process comprising one or more of, for example, alternative sequence of actions, and/or an alternative outcome.

17 Claims, 4 Drawing Sheets

(56)  References Cited

U.S. PATENT DOCUMENTS

2022/0091883 A1\*  3/2022  Gadre .................... G06N 20/00

OTHER PUBLICATIONS

Kayala, Matthew, and Pierre Baldi. "A machine learning approach to predict chemical reactions." Advances in Neural Information Processing Systems 24 (2011) (Year: 2011).\*

Fooshee, David, et al. "Deep learning for chemical reaction prediction." Molecular Systems Design & Engineering 3.3 (2018): 442-452 (Year: 2018).\*

Coley, Connor W., et al. "Prediction of organic reaction outcomes using machine learning." ACS central science 3.5 (2017): 434-443 (Year: 2017).\*

Awokuse, "Export-led growth and the Japanese economy: evidence from VAR and directed acyclic graphs," Applied Economics Letters, vol. 12, Issue 14, pp. 849-858, Aug. 2006.

Bessler et al., "Farm Prices, Retail Prices, and Directed Graphs: Results for Pork and Beef," American Journal of Agricultural Economics, vol. 80, No. 5, pp. 1144-1149, Dec. 1998.

Borenstein, "A directed acyclic graph representation of routing manufacturing flexibility," European Journal of Operational Research, vol. 127, Issue 1, pp. 78-93, Nov. 2000.

Brewer et al., "Causal inference in cumulative risk assessment: The roles of directed acyclic graphs," Environment International, vol. 102, pp. 30-41, May 2017.

Chong, A casual model of linkages among strategy, structure, and performance using directed acrylic graphs: A manufacturing subset of Fortune 500 industrials 1990-1998, Doctoral dissertation, Texas A & M University, May 2003.

Fagerholt et al., "Reducing fuel emissions by optimizing speed on shipping routes," Journal of the Operational Research Society, vol. 61, Issue 3, pp. 523-529, Dec. 2017.

Fleischer et al., "Using directed acyclic graphs to guide analyses of neighbourhood health effects: an introduction," Journal of Epidemiology & Community Health, vol. 62, Issue 9, pp. 842-846, 2008.

Ha et al., "Estimation of high-dimensional directed acyclic graphs with surrogate intervention," Biostatistics, vol. 21, No. 4, pp. 659-675, Dec. 2018.

Haigh et al., "Causality and Price Discovery: An Application of Directed Acyclic Graphs," The Journal of Business, vol. 77, No. 4, pp. 1099-1121, Oct. 2004.

Laudy et al., "Toward Building an Individual Preference Model for Personalizing Settings in the Vehicle," 2018 IEEE 88th Vehicular Technology Conference, Chicago, Illinois, US, 2018.

Madraki et al., "Efficient algorithm to find makespan in manufacturing systems under multiple scheduling perturbations," International Journal of Production Research, vol. 56, Issue 16, pp. 5402-5418, Nov. 2017.

Parise et al., "Genesis: A Next Generation Synthesis Center," DOE Grant, Sep. 2022.

Suresh et al., "A hierarchical approach for causal modeling of process systems," Computers & Chemical Engineering, vol. 123, pp. 170-183, Apr. 2019.

Tabar et al., "An empirical Bayes approach for learning directed acyclic graph using MCMC algorithm," Statistical Analysis and Data Mining, vol. 12, Issue 5, pp. 394-403, Oct. 2019.

Textor et al., "Robust causal inference using directed acyclic graphs: the R package 'dagitty'," International Journal of Epidemiology, vol. 45, Issue 6, pp. 1887-1894, Dec. 2016.

\* cited by examiner

100

COMPUTATIONAL NATURALLY-OCCURRING-ACTION INTERPRETER FOR MACHINE LEARNING

CROSS-REFERENCE TO RELATED APPLICATIONS

This application claims the benefit of, and priority to, U.S. Provisional Application No. 63/129,037, entitled "A COMPUTATIONAL NATURALLY-OCCURRING-ACTION INTERPRETER FOR MACHINE LEARNING" and filed Dec. 22, 2020, the content of which is incorporated herein by reference in its entirety.

STATEMENT REGARDING FEDERALLY SPONSORED RESEARCH

This invention was made with government support under DE-SC0019212 awarded by the Department of Energy. The government has certain rights in the invention.

BACKGROUND

Scientific research often involves experimentation in which a sequence of actions (e.g., chemistry reactions) are performed to produce some outcome or end-product. Other fields of human activity likewise involve experimenting through performance of a set of actions to try and produce some desired end results (e.g., following a recipe to achieve a consumable food). In these examples, there could be many different variations on what and how steps in the sequence are taken, and many different variations on what a desirable end-product may be.

SUMMARY

In some variations, a method is provided that includes receiving action data representative of a sequence of actions resulting in an outcome, the sequence of actions and the resulting outcome defining an observable process. The method further includes transforming the action data into a normalized representation recognizable by a computing-based analysis engine, and processing the normalized representation by the analysis engine to generate an alternative process comprising one or more of: alternative sequence of actions, or an alternative outcome.

Embodiments of the method may include at least some of the features described in the present disclosure, including one or more of the following features.

The action data may include a sequence of chemical actions resulting in a product, with the sequence of actions and the product being described, at least in part, through human-language-based observations. The alternative process may include one or more of, for example, a simplified sequence of chemical actions to produce the product, and/or alternative one or more product syntheses through adjustments to the sequence of chemical actions.

At least some of the action data may include property data representing measurable properties for one or more of, for example, at least one of the sequence actions, and/or the resulting outcome.

Transforming the action data into the normalized representation may include transforming the sequence of actions and the resulting outcome into a directed acyclic graph (DAG) representation comprising nodes joined by edges.

The method may further include converting the DAG representation into an element representation storable in a data storage device.

Transforming the sequence of actions and the resulting outcome into the DAG representation may include applying natural language processing to the sequence of actions and the resulting outcome.

Transforming the action data into the normalized representation may include transforming the sequence of actions and resulting outcome into coded normalized expressions.

Transforming the sequence of actions and resulting outcome into the coded normalized expressions may include transforming the sequence of actions and resulting outcome into algebraic expressions.

Processing the normalized representation may include processing the normalized representation with a machine-learning engine.

In some variations, a computing system is provided that includes an input stage to receive one or more input data records, and a processor-based controller, implementing one or more learning engines, in communication with a memory device to store programmable instructions, to receive action data representative of a sequence of actions resulting in an outcome, with the sequence of actions and the resulting outcome defining an observable process, transform the action data into a normalized representation recognizable by an analysis engine implemented on the processor-based controller, and process the normalized representation by the analysis engine to generate an alternative process comprising one or more of, for example, alternative sequence of actions, and/or an alternative outcome.

In some variations, a non-transitory computer readable media is provided that stores a set of instructions, executable on at least one programmable device, to receive action data representative of a sequence of actions resulting in an outcome, with the sequence of actions and the resulting outcome defining an observable process, transform the action data into a normalized representation recognizable by a computing-based analysis engine, and process the normalized representation by the analysis engine to generate an alternative process comprising one or more of, for example, alternative sequence of actions, and/or an alternative outcome.

Embodiments of the computing system and the computer readable media may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Figure 1A:
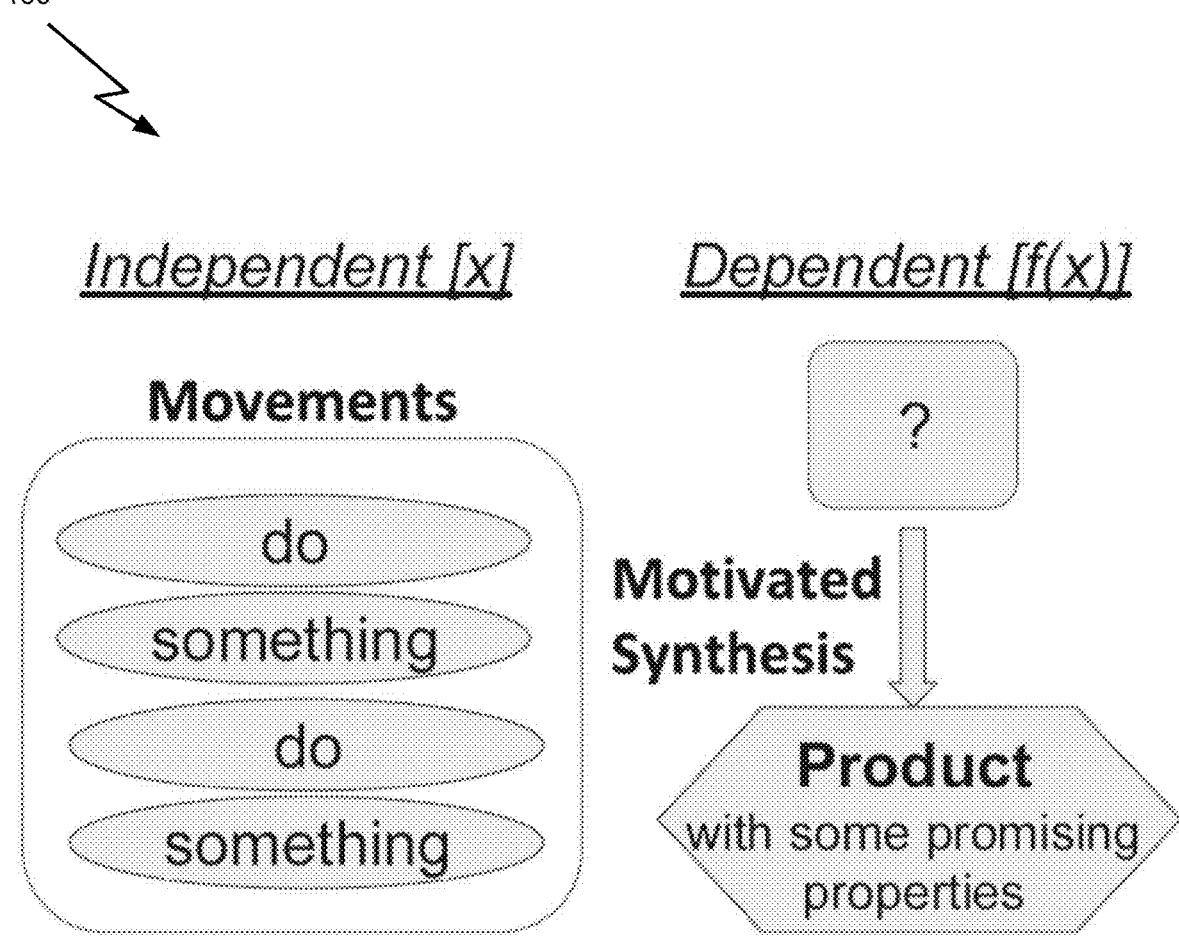
FIG. 1A is a diagram of an example directed acyclic graph (DAC) representing a synthesis process.

Disclosed are systems, methods, and other implementations (including hardware, software, and hybrid hardware/ software implementations) to encode a naturally occurring set of actions, for example a chemical synthesis or cooking recipe, in a way that is amenable to subsequent machine learning analysis. In the example of a chemical synthesis process, a system is provided that is configured to translate a naturally-occurring set of actions (the chemical synthesis process performed and recorded in a lab) into a mathematically-describable set of elements, that can be correlated with the consequence (outcome) of the action.

More particularly, when a chemical synthesis is typically described, the description is provided (and recorded) through human language, which cannot easily or efficiently be read by a computer. Interpreting a sequence of actions during chemical synthesis, upon a sufficient amount of inputs should allow identifying patterns using machine-learning processes/algorithms. Combining sets of synthesis pathways with their outcomes, or results (e.g., represented by a value or a matrix of values), could allow derivation of correlations between a chemical synthesis pathway and its outcome, even in the absence of a correct physical or chemical model. Such an approach could allow for the discovery of causality in the synthesis of new materials, the discovery of synthesis pathways towards desired (e.g., theoretically-calculated) materials, reducing the parameter space when synthesizing new (and old) materials, and autonomation of synthesis and in-operando experiments. Similar causation sequences can be formulated in other fields and disciplines.

The implementations described herein include a scheme that naturally translates synthesis steps into a directed acyclic graph (or DAG), which then can be translated by a pre-set process (algorithm) into a computationally-accessible element, e.g., a numerical vector. The process is based on the concept that a product can be described not only by its physical parameters (which are measurable) but also by the history of the actions that led to its creation. Therefore, a correlation between the measurable outcome and the creation (synthesis) pathway often exist, and can be represented. Such correlations are held as personal "intuition," while a global intuition, based on the collective knowledge of the community, is absent. The present approaches allow bridging between different "human-based" intuitions into a unified intuition using, for example, machine learning.

In some implementation, a process (that is to be translated into a representation that is more conducive to being analyzed through a learning machine, such as a neural network system) is described (represented) as a directed acyclic graph (DAG) of nodes (actions) joined by edges. DAGs representations are used herein to describe, represent, and abstract naturally occurring actions motivated by some desired goal or outcome. The motivation can be expressed as a specific sequence of actions, with certain conditions met, and optional attributes to each action. Distinct actions can be mathematically abstracted and stored as documents in databases, whereby processes become sequences of the actions (those are also referred to as "movements"). The full process may then in turn be stored in the database. When the process is carried out (an instance of the process), the results can be stored in databases resulting in structured, labelled data that captures arbitrarily complex processes and their outcomes. Correlations between actions and outcomes may then be discovered by data analytic methods. Trained mathematical models (e.g., machine learning models) may then be interrogated to find, for example, simplified processes that result in the same or similar outcome, to suggest adaptations to the process to obtain different desired outcomes, or to suggest highly-probable sequence of actions to obtain a novel material with certain similarity to the reactions used to train the mathematical models.

Figure 1B:
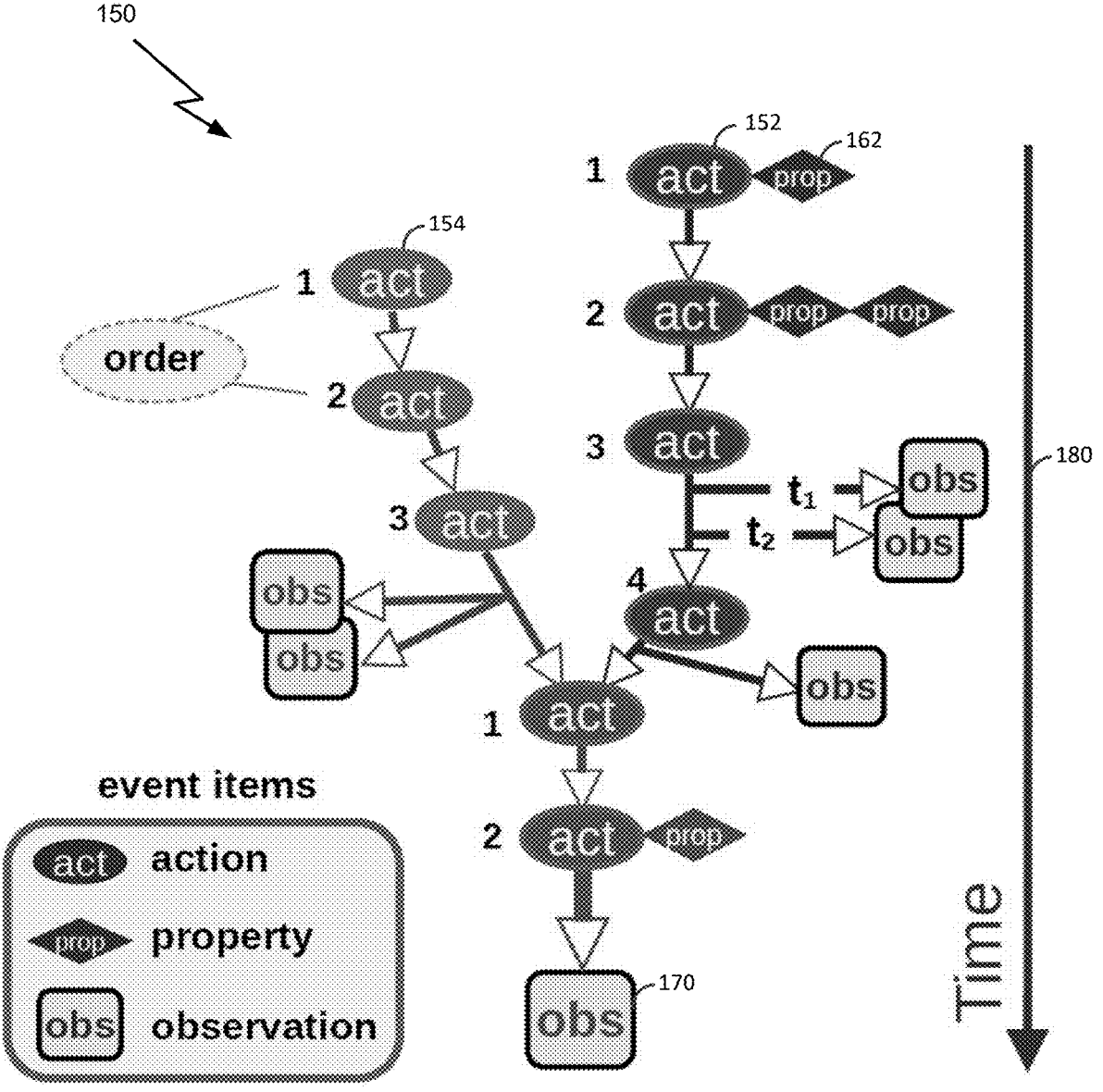
FIG. 1B is a diagram of another example directed acyclic graph to represent a process.

Thus, the concept and approaches disclosed herein are directed to describing an object not only by its attributes (color, properties, name), but optionally as the history of everything that was done to create it. To capture this information in an abstract mathematical form (a vectorized DAG) in a database, and to attach measured attributes of the object as labels. Such a database provides a powerful set of information for discovering and optimizing processes to produce the objects, to categorize objects, and to market them. The implementations described herein can result in adaptive (fuzzy) process recipes that can be adapted on the fly when situations change, and still result in acceptable or even improved outcomes, through the application of data analytics on the data in the database. An illustrative, non-limiting example of a DAG representation 100 is provided in FIG. 1A, which depicts a movement motivated synthesis (MOSY) directed acyclic graph. FIG. 1B provides another example of a DAG representation 150 of a process. As depicted in FIG. 1B, a particular process (e.g., synthesis process) can be analyzed and represented as a direct acyclic graph of interconnected nodes of different types. For example, the process of FIG. 1B is represented using action nodes (such as the nodes 152 and 154) that are associated with properties (represented by diamonds graph elements such as the elements 162 associated with the action node 152). An action node can include a value such as, for example, 'add', 'mix', 'set-temperature, or 'wait' (other action values/descriptions can also be used). each action may be characterized by an order or a timestamp. The DAG representation of the process shown in FIG. 1B also includes observation nodes such as the observation node/element 170. An observation is an event that defines what is the current state of the system, and contains descriptor information such as color, granularity, XRD-spectrum, a refined structure, etc. The purpose of the observation is to set the state of the system at a given point in time. The various nodes/elements are arranged in a configuration that can also capture temporal information. For example, in FIG. 1B, elements located at lower positions in the graph are indicative of later occurring events. That is, the vertical positioning of elements of the DAG representations is based on the timing of actions in a time frame represented by a downward extending time arrow 180. Thus, using representations such as those illustrated in FIGS. 1A and 1B, components and sequences of processes (such as chemical processes) are parsed into resultant sets of actions that characterize, for example, materials and their physical properties.

The approaches described herein may be used for realizing parameter reduction for discovery of new materials and chemical pathways for commercial and scientific needs. Many industries involved in R&D material and process discovery could potentially benefit from the approaches described herein, and this can lead to integration with automated processes in industry and every-day life. The approaches described herein may allow for training computerized machines using natural human communication (e.g., training a service robot for people with disabilities). In general, the approaches described herein provides a way to apply machine learning and AI to allow industries to save money on processes by discovering economies through the mathematical abstraction of the process (e.g., as labelled DAGs). It allows novel desirable outcomes to be sought in situations where new constraints arise in the system. For example, how best to adapt a recipe when one of the ingredients is not to hand, but still obtain a tasty dish from the available materials.

In some embodiments, the learning engines/machines described herein may be implemented according to one or more neural network configurations (examples of such configurations may include convolutional neural network (CNN), feed-forward neural networks, recurrent neural networks (RNN), etc.) Neural networks are in general composed of multiple layers of linear transformations (multiplications by a "weight" matrix), each followed by a nonlinear function. The linear transformations are learned during training by making small changes to the weight matrices that progressively make the transformations more helpful to the final classification task. A multilayer network is adapted to analyze data (such as action sequence data as discussed herein), taking into account the dimensionality or resolution of the data (e.g., a preprocessing stage may be applied to the data to normalize and/or cull some portions of the data to make the applied data compatible with the receiving/input stage of the learning machine). Other examples of learning engine approaches/architectures that may be used include generating an auto-encoder and using a dense layer of the network to correlate with probability for a future event through a support vector machine, constructing a regression or classification neural network model that predicts a specific output from data (based on training reflective of correlation between similar records and the output that is to be predicted), etc.

Implementation using neural networks can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural networks (or other types of learning machines), procedures, and methods described herein. The computing platforms used to implement the neural networks typically also include memory for storing data and software instructions for executing programmed functionality within the device. The various learning processes implemented through use of the neural networks may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Figure 2:
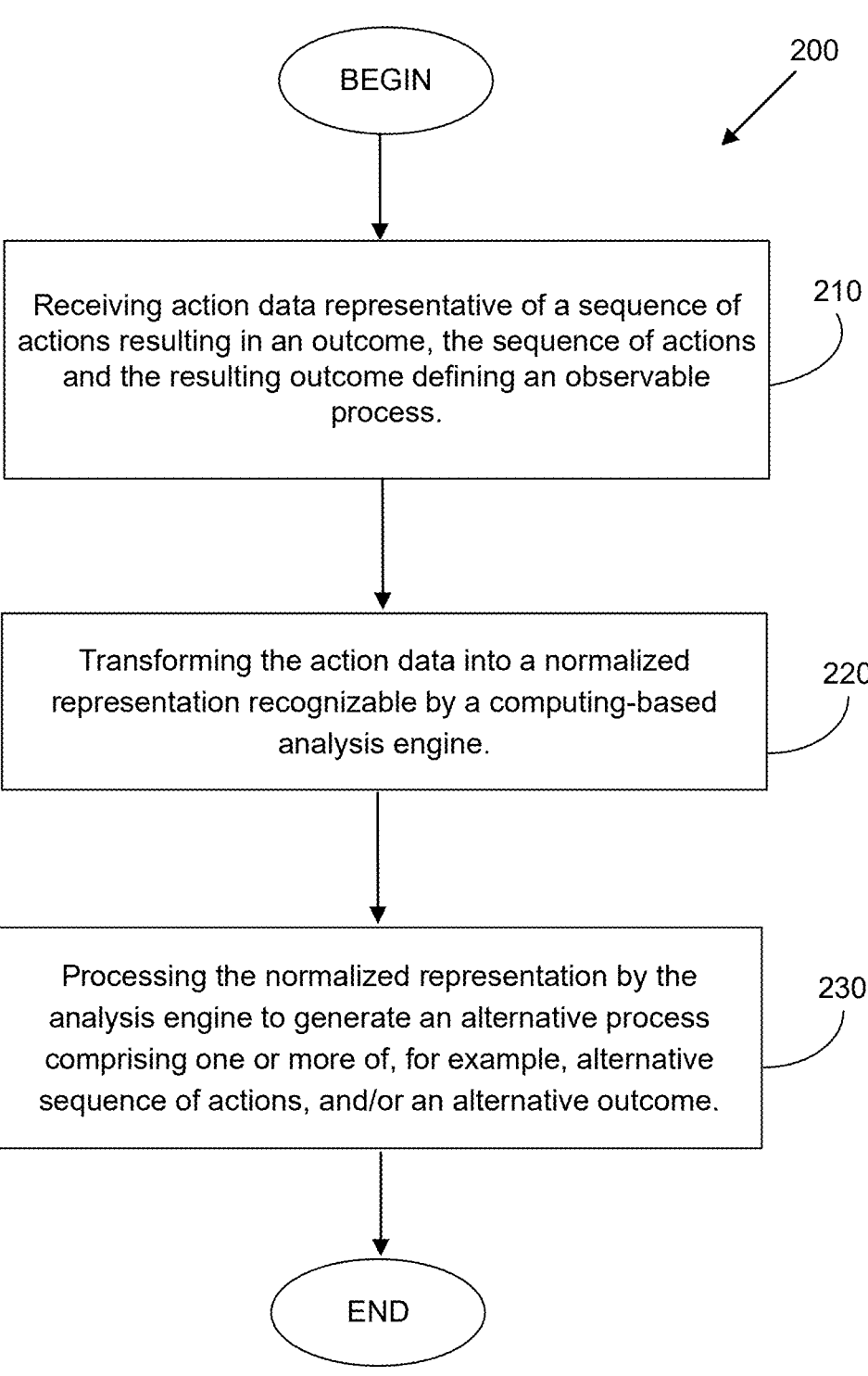
FIG. 2 is a flowchart of an autonomous process formulation procedure.

With reference next to FIG. 2, a flowchart of an autonomous process formulation procedure 200 is shown. The procedure 200 includes receiving 210 action data representative of a sequence of actions resulting in an outcome, with the sequence of actions and the resulting outcome defining an observable process. The method further includes transforming 220 the action data into a normalized representation recognizable by a computing-based analysis engine. An example of action data is one comprising a sequence of chemical actions resulting in a product, the sequence of actions and the product being described, at least in part, through human-language-based observations, and with the alternative process comprising one or more of, for example, a simplified sequence of chemical actions to produce the product, and/or alternative one or more products synthesizes through adjustments to the sequence of chemical actions. At least some of the action data may include property data representing measurable properties for one or more of, for example, at least one of the sequence actions, and/or the resulting outcome.

In some examples, transforming the action data into the normalized representation may include transforming the sequence of actions and the resulting outcome into a directed acyclic graph (DAG) representation comprising nodes joined by edges, or, alternatively, into any other abstracted representation (which may, but may not, be analogous to a DAG). In such examples, the method may further include converting the DAG representation into an element representation (e.g., vector representation, matrix representation, etc.) storable in a data storage device. In some situations, transforming the sequence of actions and the resulting outcome into the DAG representation may include applying natural language processing to the sequence of actions and the resulting outcome. Alternatively or additionally, the transforming functionality may be realized using a universal schema that is both human and machine readable, and that is flexible to a degree that is not limited to specific fields of art or science. In other examples, transforming the action data into the normalized representation may include transforming the sequence of actions and resulting outcome into coded normalized expressions (e.g., any type of normalized expression). Transforming the sequence of actions and resulting outcome into the coded normalized expressions may include transforming the sequence of actions and resulting outcome into algebraic expressions.

The procedure 200 additionally includes processing 230 the normalized representation by the analysis engine to generate an alternative process comprising one or more of, for example, alternative sequence of actions, and/or an alternative outcome. In some embodiments, processing the normalized representation may include processing the normalized representation with a machine-learning engine.

Figure 3:
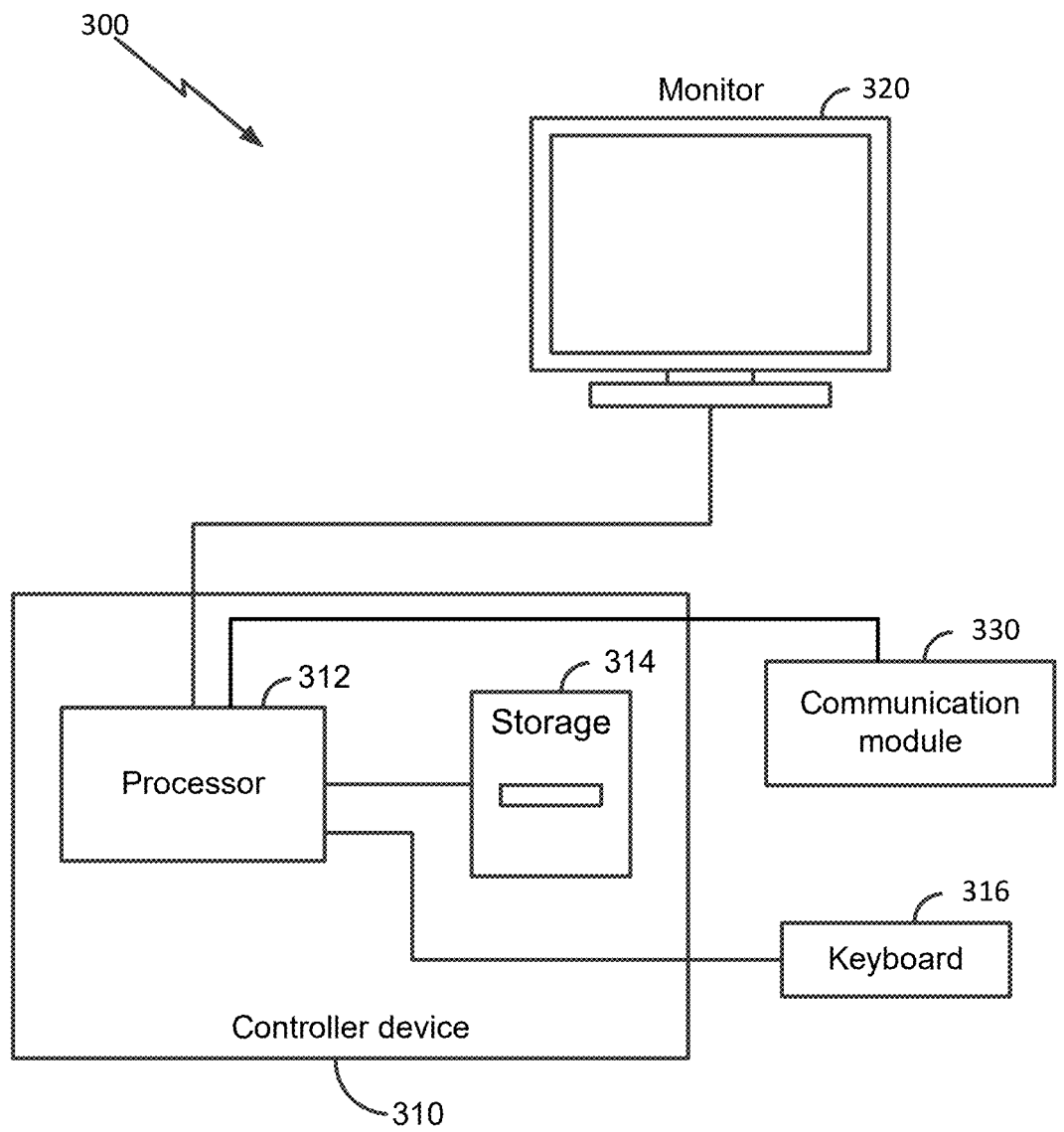
FIG. 3 is a diagram of an example controller system configured to implement an autonomous process formulation platform.

Performing the various techniques and operations described herein may be facilitated by a controller system (e.g., a processor-based computing system). FIG. 3 includes a diagram of an example controller system 300, configured to implement an autonomous process formulation platform. The controller/computing system 300 include a controller device 310 such as a personal computer, a specialized computing device, and so forth, that typically includes a central processor unit or a processing core 312. The system 300 may also include one or more dedicated learning machines (e.g., neural networks) that may be part of the CPU or processing core, or may otherwise be implemented using the CPU or processing core. In addition to the processor unit 312, the system comprises storage 314 that includes one or more of a volatile local memory device, cache memory, etc., as well as and bus interface circuits interconnecting the various memory components (and other components of the controller system 300). The controller device may include a mass storage element, such as a hard drive (solid state hard drive, or other types of hard drive), or flash drive associated with the computer system. The computing system may further include a keyboard 316, or keypad, or some other user input interface, and a monitor 320, e.g., an LCD (liquid crystal display) monitor, that may be placed where a user can access them.

The controller system 300 is configured to facilitate, for example, the implementation of encoding a sequence of multiple actions (e.g., naturally occurring actions) into representations (e.g., DAG representation, or some other type of mathematically/physically descriptive representation) that are more conducive for analysis (e.g., machine learning analysis). The storage device 314 may thus include a computer program product that when executed on the processor-based device causes the processor-based device to perform operations to facilitate the implementation of procedures and operations described herein. The processor-based device may further include peripheral devices to enable input/output functionality. Such peripheral devices may include, for example, a CD-ROM drive and/or flash drive (e.g., a removable flash drive), or a communication module 330 to facilitate establishment of network connections (e.g., implemented using a USB port and/or a wireless transceiver), for downloading related content to the connected system and/or input data records (experimental and analytical results from, for example, one or more databased recording scientific and technological operation and product data) and based on which new/alternative scientific/technological processes (e.g., new chemical synthesis processes) may be formulated. The communication module 330 may also include sensor and/or data acquisition devices such as, for example, an image-capture device (e.g., a digital camera) to obtain image data corresponding to a document, a scanner to generate a scanned electronic copy of a document, a wireless or wired transceiver to receive electronic messages representative of source data, inertial sensors, etc. The peripheral devices may also be used for downloading software containing computer instructions to enable general operation of the respective system/device.

Alternatively and/or additionally, in some embodiments, special purpose logic circuitry, e.g., an FPGA (field programmable gate array), an ASIC (application-specific integrated circuit), a DSP processor, etc., may be used in the implementation of the controller system. Other modules that may be included with the processor-based device are speakers, a sound card, a pointing device, e.g., a mouse or a trackball, by which the user can provide input to the computing system, etc. Additionally, in some embodiments, sensor devices such as a light-capture device (e.g., a CMOS-based or CCD-based camera device), other types of optical or electromagnetic sensors, sensors for measuring environmental conditions, etc., may be coupled to the controller system, and may be configured to observe or measure the processes and actions being monitored. The processor-based device may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, in some embodiments, a computing system is provided that includes an input stage to receive one or more input data records, and a processor-based controller, implementing one or more learning engines, in communication with a memory device to store programmable instructions. The processor-based controller is configured to receive action data representative of a sequence of actions resulting in an outcome, with the sequence of actions and the resulting outcome defining an observable process, transform the action data into a normalized representation recognizable by an analysis engine implemented on the processor-based controller, and process the normalized representation by the analysis engine to generate an alternative process comprising one or more of, for example, alternative sequence of actions, and/or an alternative outcome. In some embodiments, a non-transitory computer readable media is provided, for storing a set of instructions, executable on at least one programmable device, to receive action data representative of a sequence of actions resulting in an outcome, with the sequence of actions and the resulting outcome defining an observable process, transform the action data into a normalized representation recognizable by a computing-based analysis engine, and process the normalized representation by the analysis engine to generate an alternative process comprising one or more of, for example, alternative sequence of actions, and/or an alternative outcome.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:

receiving by a processor-based device action data representative of a sequence of actions resulting in an outcome, the sequence of actions, the resulting outcome, and respective properties associated with the sequence of actions and the resulting outcome defining a first observable process;

transforming by the processing-based device the action data into a normalized representation recognizable by a machine learning analysis engine, wherein the machine learning analysis engine is configured to access and process one or more databases maintaining multiple records of previously transformed normalized representations of other different processes with corresponding sequences of action, resulting outcomes, and properties; and processing the normalized representation by the machine learning analysis engine to generate, based on correlations determined from the normalized representation of the first observable process and the multiple records of the previously transformed normalized representations of the other processes, an alternative process, for the first observable process, comprising one or more of: alternative sequence of actions determined from the correlations, or an alternative outcome determined from the correlations.

2. The method of claim 1, wherein the action data comprises a sequence of chemical actions resulting in a product, the sequence of actions and the product being described, at least in part, through human-language-based observations, and wherein the alternative process comprises one or more of: a simplified sequence of chemical actions to produce the product, or alternative one or more product syntheses through adjustments to the sequence of chemical actions.

3. The method of claim 1, wherein at least some of the action data includes property data representing measurable properties for one or more of: at least one of the sequence actions, or the resulting outcome.

4. The method of claim 1, wherein transforming the action data into the normalized representation comprises:

transforming the sequence of actions and the resulting outcome into a directed acyclic graph (DAG) representation comprising nodes joined by edges.

5. The method of claim 4, further comprising converting the DAG representation into an element representation storable in a data storage device.

6. The method of claim 4, wherein transforming the sequence of actions and the resulting outcome into the DAG representation comprises:

applying natural language processing to the sequence of actions and the resulting outcome.

7. The method of claim 1, wherein transforming the action data into the normalized representation comprises:

transforming the sequence of actions and resulting outcome into coded normalized expressions.

8. The method of claim 7, wherein transforming the sequence of actions and resulting outcome into the coded normalized expressions comprises transforming the sequence of actions and resulting outcome into algebraic expressions.

9. A computing system comprising:

an input stage to receive one or more input data records; and a processor-based controller, implementing one or more learning engines, in communication with a memory device to store programmable instructions, to:

receive action data representative of a sequence of actions resulting in an outcome, the sequence of actions, the resulting outcome, and respective properties associated with the sequence of actions and the resulting outcome defining a first observable process;

transform the action data into a normalized representation recognizable by a machine learning analysis engine implemented on the processor-based controller, wherein the machine learning analysis engine is configured to access and process one or more databases maintaining multiple records of previously transformed normalized representations of other different ferent processes with corresponding sequences of action, resulting outcomes, and properties; and process the normalized representation by the machine learning analysis engine to generate, based on correlations determined from the normalized representation of the first observable process and the multiple records of the previously transformed normalized representations of the other processes, an alternative process, for the first observable process, comprising one or more of: alternative sequence of actions determined from the correlations, or an alternative outcome determined from the correlations.

10. The system of claim 9, wherein the action data comprises a sequence of chemical actions resulting in a product, the sequence of actions and the product being described, at least in part, through human-language-based observations, and wherein the alternative process comprises one or more of: a simplified sequence of chemical actions to produce the product, or alternative one or more product syntheses through adjustments to the sequence of chemical actions.

11. The system of claim 9, wherein at least some of the action data includes property data representing measurable properties for one or more of: at least one of the sequence actions, or the resulting outcome.

12. The system of claim 9, wherein the processor-based controller configured to transform the action data into the normalized representation is configured to:

transform the sequence of actions and the resulting outcome into a directed acyclic graph (DAG) representation comprising nodes joined by edges.

13. The system of claim 12, wherein the process-based controller is further configured to convert the DAG representation into an element representation storable in a data storage device.

14. The system of claim 9, wherein the processor-based controller configured to transform the action data into the normalized representation is configured to:

transform the sequence of actions and resulting outcome into coded normalized expressions.

15. A non-transitory computer readable media storing a set of instructions, executable on at least one programmable device, to:

receive action data representative of a sequence of actions resulting in an outcome, the sequence of actions, the resulting outcome, and respective properties associated with the sequence of actions and the resulting outcome defining a first observable process;

transform the action data into a normalized representation recognizable by a machine learning analysis engine, wherein the machine learning analysis engine is configured to access and process one or more databases maintaining multiple records of previously transformed normalized representations of other different processes with corresponding sequences of action, resulting outcomes, and properties; and process the normalized representation by the machine learning analysis engine to generate, based on correlations determined from the normalized representation of the first observable process and the multiple records of the previously transformed normalized representations of the other processes, an alternative process, for the first observable process, comprising one or more of: alternative sequence of actions determined from the correlations, or an alternative outcome determined from the correlations.

16. The computer readable media of claim 15, wherein the action data comprises a sequence of chemical actions resulting in a product, the sequence of actions and the product being described, at least in part, through human-language-based observations, and wherein the alternative process comprises one or more of: a simplified sequence of chemical actions to produce the product, or alternative one or more product syntheses through adjustments to the sequence of chemical actions.

17. The computer readable media of claim 15, wherein at least some of the action data includes property data representing measurable properties for one or more of: at least one of the sequence actions, or the resulting outcome.

\* \* \* \* \*